(12) United States Patent
Taylor et al.

(10) Patent No.: US 6,608,006 B2
(45) Date of Patent: Aug. 19, 2003

(54) METHODS OF DRILLING WELL BORES USING INVERTIBLE OIL EXTERNAL-WATER INTERNAL DRILLING FLUIDS

(75) Inventors: Robert S. Taylor, Red Deer (CA); Suzanne Arnold, Tomball, TX (US); Tommy R. Gardner, Duncan, OK (US); Karen L. King, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 83 days.

(21) Appl. No.: 09/952,410

(22) Filed: Sep. 14, 2001

(65) Prior Publication Data

US 2003/0054961 A1 Mar. 20, 2003

(51) Int. Cl.$^7$ .............................. C09K 7/06; C09K 7/02
(52) U.S. Cl. ........................ 507/131; 507/129; 507/135; 507/145; 507/239; 507/244; 507/259; 507/277; 507/921
(58) Field of Search ................................. 507/129, 131, 507/145, 239, 244, 277, 921, 135, 259

(56) References Cited

U.S. PATENT DOCUMENTS

| | | | | |
|---|---|---|---|---|
| RE28,474 E | * | 7/1975 | Anderson et al. | 507/131 |
| 4,552,670 A | * | 11/1985 | Lipowski et al. | 507/131 |
| 5,905,061 A | * | 5/1999 | Patel | 507/129 |
| 6,165,946 A | * | 12/2000 | Mueller et al. | 507/203 |
| 6,218,342 B1 | | 4/2001 | Patel | 507/129 |
| 2001/0051593 A1 | * | 12/2001 | Patel | 507/129 |

\* cited by examiner

*Primary Examiner*—Philip Tucker
(74) *Attorney, Agent, or Firm*—Robert A. Kent; C. Clark Dougherty, Jr.

(57) ABSTRACT

Methods of drilling well bores using an invertible oil external-water internal emulsion drilling fluid and then inverting the drilling fluid to a water external-oil internal emulsion are provided. The methods basically comprise the steps of contacting the oil external-water internal emulsion with an aqueous acid solution containing an anionic sulfonate surfactant for preventing aqueous acid solution-crude oil emulsions and crude oil sludging and a chemical for preventing the anionic sulfonate surfactant from reacting with the emulsifier in the oil external-water internal emulsion.

20 Claims, No Drawings

METHODS OF DRILLING WELL BORES USING INVERTIBLE OIL EXTERNAL-WATER INTERNAL DRILLING FLUIDS

BACKGROUND OF THE INVENTION

1. Field of the Invention

The present invention relates to improved methods of drilling well bores using invertible oil external-water internal emulsion drilling fluids.

2. Description of the Prior Art

Invertible oil external-water internal emulsion drilling fluids have been utilized heretofore for drilling well bores penetrating one or more crude oil producing zones. Such emulsion drilling fluids lubricate the drill bit and reduce the overall time required for drilling well bores. The oil external-water internal emulsion drilling fluids have heretofore been stabilized with nonionic amine emulsifiers and the emulsions have a high pH which insures that the emulsifier retains a non-ionic oil wetting character during drilling.

When a well bore has reached total depth and penetrated one or more oil producing zones, the oil external-water internal emulsion drilling fluid is contacted with an acid which protonates the nonionic amine emulsifier causing it to take on a cationic charge and increase in water solubility. The resulting water soluble emulsifier has water wetting properties, and as a result, the oil and water phases in the emulsion invert whereby a water external-oil internal emulsion of lower viscosity is formed in the well bore.

The inverted low viscosity water external-oil internal emulsion water wets the producing formations which increases oil production. In addition, the water external-oil internal emulsion fluid is easier to clean up whereby subsequent operations such as cementing or stimulation can be accomplished.

The acid utilized for contacting the oil external-water internal emulsion drilling fluid and causing it to invert is generally in the form of an aqueous acid solution. In order to prevent the formation of aqueous acid solution-crude oil emulsions and crude oil sludging, the aqueous acid solutions used have heretofore contained anionic sulfonate surfactants. While the anionic sulfonate surfactants function well in preventing the formation of aqueous acid-crude oil emulsions and prevent oil sludging from taking place, it has been discovered that the anionic sulfonate surfactants react with the amine emulsifier after it is protonated by acid. The result of the reaction is that the emulsifier does not become water soluble and does not invert the oil external-water internal emulsion to a water external-oil internal emulsion. This not only prevents water wetting and faster clean up, but the aqueous acid solution utilized adds to the internal water phase of the emulsion which results in the emulsion significantly increasing in viscosity. The highly viscous oil external-water internal emulsion formed is difficult to remove and can cause damage to the crude oil producing zones penetrated by the well bore.

Thus, there are needs for improved methods of drilling well bores penetrating crude oil producing zones using invertible oil external-water internal emulsion drilling fluids whereby problems related to the non-inversion of the emulsion drilling fluids do not take place.

SUMMARY OF THE INVENTION

The present invention provides improved methods of drilling well bores using invertible oil external-water internal drilling fluids which meet the needs described above and overcome the deficiencies of the prior art. That is, in accordance with the present invention, improved methods of drilling well bores penetrating one or more crude oil producing zones using an invertible oil external-water internal emulsion drilling fluid stabilized with a nonionic amine emulsifier and then inverting the drilling fluid to a water external-oil internal emulsion are provided. In accordance with the methods, a well bore is drilled using an oil external-water internal emulsion drilling fluid. An aqueous acid solution comprised of water, an acid, an anionic sulfonate surfactant for preventing the formation of aqueous acid solution-crude oil emulsions and crude oil sludging and a chemical for preventing the anionic sulfonate surfactant from reacting with the nonionic emulsifier is prepared. The oil external-water internal emulsion drilling fluid is next contacted with the aqueous acid solution to thereby invert the emulsion and the inverted water external-oil internal emulsion is removed from the well bore.

It is, therefore, a general object of the present invention to provide improved methods of drilling well bores using invertible oil external-water internal drilling fluids.

Other and further objects, features and advantages of the present invention will be readily apparent to those skilled in the art upon a reading of the description of preferred embodiments which follows.

DESCRIPTION OF PREFERRED EMBODIMENTS

Well bores have heretofore been drilled into one or more crude oil producing zones using invertible oil external-water internal emulsion drilling fluids stabilized with high pH nonionic emulsifiers. When the well bore reaches total depth, the oil external-water internal emulsion is contacted with an aqueous acid solution to invert the emulsion, i.e., to form a lower viscosity water external-oil internal emulsion which water wets the formation surfaces in the well bore and facilitates the clean up of the well bore.

In accordance with the present invention, the oil external-water internal emulsion drilling fluid is contacted with an aqueous acid solution comprised of water, an acid, an anionic sulfonate surfactant for preventing the formation of aqueous acid solution-crude oil emulsions and crude oil sludging and a chemical for preventing the anionic sulfonate surfactant from reacting with the nonionic emulsifier after the emulsifier is made cationic by the acid. After the drilling fluid has been inverted to a water external-oil internal emulsion, the emulsion is removed from the well bore.

The chemical for preventing a reaction between the anionic sulfonate surfactant and the cationic emulsifier is preferably selected from the group of ethoxylated rosin amines and ethoxylated alkyl amines. The term "rosin amines" is used herein to mean hydroabietylamines. The term "alkyl amine" is used herein to mean alkylamines having from about 8 to about 20 or more carbons.

The oil used for forming the invertible oil external-water internal emulsion drilling fluid includes, but is not limited to, olefins, kerosene, diesel oil, gas oil (also known as gas condensates), fuel oil and certain mixtures of crude oil. Of these, a mixture of internal olefins having in the range of from about 8 to about 24 carbon atoms is preferred. The water utilized in the emulsion can be fresh water or salt water, with calcium-containing brine being preferred. As mentioned, the emulsion is stabilized with a nonionic amine emulsifier, preferably an ethoxylated soya amine emulsifier. Other components of the emulsion generally include lime for producing a high pH, various surfactants, and weighting materials. The various components of oil external-water internal emulsion drilling fluids are well known to those skilled in the art as are the techniques for forming the emulsion drilling fluids.

As mentioned above, upon the completion of drilling a well bore with the oil external-water internal emulsion drilling fluid, the drilling fluid is contacted with an aqueous acid solution which causes it to invert to a water external-oil internal emulsion. The aqueous acid solutions utilized have heretofore included strongly anionic sulfonate surfactants for preventing the formation of aqueous acid solution-crude oil emulsions in the well bore and crude oil sludging therein. Examples of such strongly anionic sulfonate surfactants include, but are not limited to, linear or branched alkylbenzyl sulfonates, alkyl diphenyloxide disulfonates, alpha-olefin sulfonates and sulfosuccinates. While the anionic sulfonate surfactants successfully prevent the formation of aqueous acid solution-crude oil emulsions and crude oil sludging, it has been discovered that they often also prevent an oil external-water internal emulsion drilling fluid from inverting whereby the emulsion increases in viscosity making it extremely difficult to remove from the well bore.

More specifically, strongly anionic sulfonate surfactants react with the nonionic emulsifier after it has been protonated by the acid whereby it becomes cationic and increases in water solubility. When the cationic emulsifier does not react with a strongly anionic sulfonate surfactant and remains water soluble, the oil external-water internal emulsion inverts and a water external-oil internal emulsion with water wetting properties is formed. However, as mentioned above, when the cationic emulsifier reacts with the strongly anionic sulfonate surfactant, the emulsifier becomes water insoluble and does not form a water external-oil internal emulsion. Instead, the emulsion remains oil wetting and water internal, and the aqueous acid solution adds to the internal water phase which results in a significant viscosity increase. The viscosity increase not only makes it difficult to remove the high viscosity oil external-water internal emulsion from the well bore, but the high viscosity emulsion can plug the porosity of producing formations penetrated by the well bore.

In accordance with the present invention, a chemical selected from ethoxylated rosin amines or ethoxylated alkyl amines is included in the aqueous acid solution for preventing the anionic sulfonate surfactant therein from reacting with the nonionic emulsifier after the emulsifier is made cationic by the acid. This in turn allows the cationic emulsifier to cause the oil external-water internal emulsion to invert to a water external-oil internal emulsion. The aqueous acid solution combines with the external water phase of the emulsion which brings about a reduction in viscosity and facilitates an easy removal of the inverted emulsion from the well bore.

The ethoxylated rosin and alkyl amine chemicals for preventing the anionic sulfonate surfactant or surfactants in the aqueous acid solution from reacting with the nonionic emulsifier when contacted therewith are preferably selected from the group of hydroabietylamines ethoxylated with from about 2 to about 30 moles of ethylene oxide per mole and one or a mixture of alkylamines having from about 8 to about 20 or more carbon atoms and ethoxylated with from about 2 to about 30 moles of ethylene oxide per mole. Suitable commercially available hydroabietylamines which can be utilized include, but are not limited to, a mixture of 90% by weight hydroabietylamines ethoxylated with 11 moles of ethylene oxide per mole and 10% by weight non-ethoxylated hydroabietylamines which is commercially available from Hercules Inc. of Wilmington, Del. under the trade designation "POLYRAD 1110™"; 100% hydroabietylamines ethoxylated with 11 moles of ethylene oxide per mole commercially available from Hercules Inc. of Wilmington, Del. under the trade designation "POLYRAD 1100™"; a mixture of 85% by weight hydroabietylamines ethoxylated with 5 moles of ethylene oxide per mole and 15% by weight non-ethoxylated hydroabietylamines commercially available from Hercules Inc. of Wilmington, Del. under the trade name designation "POLYRAD 0515™"; and 100% hydroabietylamines ethoxylated with 5 moles of ethylene oxide per mole commercially available from Hercules Inc. of Wilmington, Del. under the trade designation "POLYRAD 0500™." A suitable commercially available mixture of alkylamines having from 8 to 18 alkyl carbon atoms and ethoxylated with 15 moles of ethylene oxide per mole is commercially available from Akzo Nobel Inc. of Chicago, Ill. under the trade designation "ETHOMEEN C-25™." Of the foregoing chemicals, "POLYRAD 1110™" is preferred.

The aqueous acid solution for contacting the oil external-water internal emulsion in accordance with this invention to bring about its inversion to a water external-oil internal emulsion while preventing the formation of aqueous acid solution-crude oil emulsion and crude oil sludging is basically comprised of water, an acid, an anionic sulfonate surfactant for preventing the formation of aqueous acid solution-crude oil emulsions and crude oil sludging and a chemical for preventing the anionic sulfonate surfactant from reacting with the emulsifier in the oil external-water internal emulsion, the chemical being selected from the group of ethoxylated rosin and alkyl amines.

As mentioned above, the acid in the aqueous acid solution can be selected from inorganic acids, such as hydrochloric acid, or from organic acids, such as acetic, formic, glycolic acid or combinations thereof. Preferably, the acid is hydrochloric acid and is included in the aqueous acid solution in an amount in the range of from about 1% to about 36% by weight of water in the solution, more preferably in an amount of about 10% to about 15%.

The anionic sulfonate surfactant can be selected from the group of linear or branched alkylbenzyl sulfonates such as linear or branched dodecylbenzenesulfonate or dodecylbenzenesulfonic acid, alkyl diphenyloxide disulfonates, alpha-olefin sulfonates and sulfosuccinates. Of these, linear dodecylbenzenesulfonic acid is preferred. The anionic sulfonate surfactant is included in the aqueous acid solution in an amount in the range of from about 0.1% to about 1.5% by weight of water therein, more preferably in an amount of about 0.4% to about 0.8%.

Finally, the chemical for preventing the anionic sulfonate surfactant from reacting with the nonionic emulsifier utilized in the oil external-water internal emulsion after the emulsifier is made cationic by the acid is preferably selected from the group of ethoxylated rosin and alkyl amines comprised of a mixture of 90% by weight hydroabietylamines ethoxylated with 11 moles of ethylene oxide per mole and 10% by weight non-ethoxylated hydroabietylamines, hydroabietylamines ethoxylated with 11 moles of ethylene oxide per mole, a mixture of 85% by weight hydroabietylamines ethoxylated with 5 moles of ethylene oxide per mole and 15% by weight non-ethoxylated hydroabietylamines, hydroabietylamines ethoxylated with 5 moles of ethylene oxide per mole, and a mixture of alkylamines having from about 8 carbon atoms to about 20 or more carbon atoms in the alkyl groups ethoxylated with from about 2 to about 30 moles of ethylene oxide per mole. The ethoxylated rosin or alkyl amines are included in the aqueous acid solution in an amount in the range of from about 0.1% to about 3.0% by weight of water therein, more preferably in an amount of about 0.5%.

The present invention provides an improved method of drilling a well bore penetrating one or more crude oil producing zones using an invertible oil external-water internal emulsion drilling fluid stabilized with a nonionic amine emulsifier. The well bore is drilled with the oil external-water internal drilling fluid after which the oil external-water internal emulsion drilling fluid is inverted and reduced in viscosity by contacting the emulsion drilling fluid with an aqueous acid solution. The aqueous acid solution is comprised of water, an acid, an anionic sulfonate surfactant for preventing the formation of aqueous acid solution-crude oil emulsions and crude oil sludging and one or more of the chemicals described above for preventing the anionic sulfonate surfactant from reacting with the amine emulsifier after the emulsifier is made cationic by the acid. Thereafter, the inverted water external-oil internal emulsion is removed from the well bore.

As mentioned above, the acid utilized in the above method is preferably hydrochloric acid. The anionic sulfonate surfactant is preferably linear dodecylbenzenesulfonic acid and the chemical is preferably selected from the group of ethoxylated hydroabietylamines and ethoxylated alkylamines set forth above.

Another improved method of this invention for drilling a well bore penetrating one or more crude oil producing zones using an invertible oil external-water internal emulsion drilling fluid stabilized with a nonionic amine emulsifier and then inverting the drilling fluid to a water external-oil internal emulsion is comprised of the following steps: (a) drilling the well bore using the oil external-water internal emulsion drilling fluid; (b) preparing an aqueous acid solution comprised of water, hydrochloric acid, an anionic sulfonate surfactant for preventing the formation of aqueous acid solution-crude oil emulsions and crude oil sludging and a chemical for preventing the anionic sulfonate surfactant from reacting with the nonionic amine emulsifier; (c) contacting the oil external-water internal emulsion with the aqueous acid solution to thereby invert the emulsion; and (d) removing the inverted water external-oil internal emulsion from the well bore.

The acid utilized in the above method can be selected from inorganic acids, such as hydrochloric acid, or from organic acids, such as acetic acid, formic acid, combinations of acetic and formic acids, and glycolic acid. Hydrochloric acid is preferred. The anionic sulfonate surfactant can be selected from the group consisting of linear or branched alkylbenzyl sulfonates, alkyl diphenyloxide disulfonates, alpha-olefin sulfonates and sulfosuccinates. Dodecylbenzenesulfonic acid is preferred. The chemical for preventing the anionic sulfonate surfactant from reacting with the nonionic amine emulsifier can be selected from the group of ethoxylated hydroabietylamines and ethoxylated alkylamines set forth above. One or more of the ethoxylated hydroabietylamines is preferred.

In order to further illustrate the methods of the present invention, the following example is given.

EXAMPLE

An invertible oil external-water internal emulsion drilling fluid was prepared in the laboratory comprised of a mixture of olefins having in the range of from about 8 to about 24 carbon atoms, calcium containing brine, lime and a nonionic ethoxylated soya amine emulsifier. Aqueous acid solutions were also prepared comprised of a 15% by weight aqueous hydrochloric acid solution to which linear dodecylbenzene sulfonic acid was added in an amount of 0.8% by weight of the resulting acid solution (Acid Solution A) and a 15% by weight aqueous hydrochloric acid solution to which linear dodecylbenzene sulfonic acid was added in an amount of 1.2% by weight of the resulting solution (Acid Solution B).

Test portions of the acid solutions were added to test portions of the invertible oil external-water internal emulsion drilling fluid and the viscosities of the resulting test mixtures were measured using a Fann 35A viscometer at a shear rate of 511/sec. Thereafter, various portions of a mixture of ethoxylated rosin amines and a mixture of ethoxylated coco amines were added to test portions of the combined acid solution-emulsion drilling fluids and the viscosities of the resulting test mixtures were measured.

The components of the test mixtures utilizing the ethoxylated rosin amine, i.e., a mixture of 90% by weight hydroabietylamines ethoxylated with 11 moles of ethylene oxide per mole and 10% by weight non-ethoxylated hydroabietylamines (Hercules, Inc. "POLYRAD 1110™") and the results of the tests are given in Table I below. The components of the test mixtures utilizing the ethoxylated coco amine, i.e., a mixture of alkylamines, having from 8 to 18 carbon atoms ethoxylated with from 15 moles of ethylene oxide per mole. (Akzo Noble "ETHOMEEN C-25™") and the results of the tests are given in Table II below.

TABLE I

Viscosities Of Aqueous Acid Solutions Containing Dodecylbenzene Sulfonic Acid/Invertible Oil External-Water Internal Emulsion Drilling Fluid Mixtures With Various Quantities Of Ethoxylated Rosin Amine

| Ethoxylated Rosin Amine[1] Added To Acid/Emulsion Drilling Fluid Mixture, % by volume | Viscosity[2] Of Acid Solution A[3]/Emulsion Drilling Fluid[4] Mixture Before And After Ethoxylated Rosin Amine Added, Centipoises | Viscosity[2] Of Acid Solution B[5]/Emulsion Drilling Fluid[4] Mixture Before And After Ethoxylated Rosin Amine Added, Centipoises |
|---|---|---|
| 0 | 450 | 410 |
| 0.5 | 260 | 300 |
| 1.0 | 20 | 200 |
| 1.5 | 15 | 15 |

[1]Mixture of 90% by weight hydroabietylamines ethoxylated with 11 moles of ethylene oxide per mole and 10% by weight non-ethoxylated hydroabietylamines (Hercules, Inc. "POLYRAD 1110 ™").
[2]Viscosity measured using a Fann 35A viscometer at a shear rate of 511/sec.
[3]15% by weight hydrochloric acid solution to which linear dodecylbenzene sulfonic acid was added in an amount of 0.8% by weight of the resulting acid solution.
[4]Mixture of olefins having from 8 to 24 carbon atoms, calcium containing brine, lime and nonionic ethoxylated soya amine emulsifier.
[5]15% by weight aqueous hydrochloric acid solution to which linear dodecylbenzene sulfonic acid was added in an amount of 1.2% by weight of the resulting acid solution.

TABLE II

Viscosities Of Aqueous Acid Solutions Containing Dodecylbenzene Sulfonic Acid/Invertible Oil External-Water Internal Emulsion Drilling Fluid Mixtures With Various Quantities Of Ethoxylated Coco Amine

| Ethoxylated Coco Amine[1] Added To | Viscosity[2] Of Acid Solution A[3]/Emulsion Drilling Fluid[4] Mixture Before And After | Viscosity[2] Of Acid Solution B[5]/Emulsion Drilling Fluid[4] Mixture Before And After |
|---|---|---|

| Acid/Emulsion Drilling Fluid Mixture, % by volume | Ethoxylated Coco Amine Added, Centipoises | Ethoxylated Coco Amine Added, Centipoises |
|---|---|---|
| 0 | 450 | 405 |
| 0.5 | 30 | 275 |
| 1.0 | 25 | 110 |
| 1.5 | 20 | 25 |

[1] Mixture of alkylamines having from 8 to 18 carbon atoms ethoxylated with from 15 moles of ethylene oxide per mole (Akzo Nobel "ETHOMEEN C-25 ™").
[2] Viscosity measured using a Fann 35A viscometer at a shear rate of 511/sec.
[3] 15% by weight aqueous hydrochloric acid solution to which linear dodecylbenzene sulfonic acid was added in an amount of 0.8% by weight of the resulting acid solution.
[4] Mixture of olefins having from 8 to 24 carbon atoms, calcium containing brine, lime and nonionic ethoxylated soya amine emulsifier.
[5] 15% by weight aqueous hydrochloric acid solution to which linear dodecylbenzene sulfonic acid was added in an amount of 1.2% by weight of the resulting acid solution.

From Table I and Table II, it can be seen that effective phase inversion does not take place without the presence of the ethoxylated rosin or coco amines.

Thus, the present invention is well adapted to attain the objects and advantages mentioned as well as those which are inherent therein. While numerous changes may be made by those skilled in the art, such changes are encompassed within the spirit of this invention as defined by the appended claims.

What is claimed is:

1. In a method of drilling a well bore penetrating one or more crude oil producing zones using an invertible oil external-water internal emulsion drilling fluid stabilized with a nonionic emulsifier and then inverting the drilling fluid to a water external-oil internal emulsion by contact with an aqueous acid solution, the improvement which comprises the steps of:
    (a) contacting said oil external-water internal emulsion with an aqueous acid solution to invert said emulsion comprised of water, an acid, an anionic sulfonate surfactant for preventing the formation of aqueous acid solution-crude oil emulsions and crude oil sludging and a chemical for preventing said anionic sulfonate surfactant from reacting with said nonionic emulsifier after said emulsifier is made cationic by said acid; and then
    (b) removing said inverted water external-oil internal emulsion from said well bore.

2. The method of claim 1 wherein said nonionic emulsifier is a nonionic amine emulsifier.

3. The method of claim 1 wherein said nonionic emulsifier is an ethoxylated soya amine emulsifier.

4. The method of claim 1 wherein said acid in said aqueous acid solution is selected from the group consisting of inorganic acids, organic acids and mixtures of said acids.

5. The method of claim 1 wherein said acid is hydrochloric acid.

6. The method of claim 1 wherein said acid is present in said aqueous acid solution in an amount in the range of from about 1% to about 36% by weight of water in said solution.

7. The method of claim 1 wherein said anionic sulfonate surfactant is selected from the group consisting of linear or branched dodecylbenzenesulfonic acid, linear or branched alkylbenzyl sulfonates, alkyl diphenyloxide disulfonates, alpha-olefin sulfonates and sulfosuccinates.

8. The method of claim 1 wherein said anionic sulfonate surfactant is linear dodecylbenzenesulfonic acid.

9. The method of claim 1 wherein said anionic sulfonate surfactant is present in said aqueous acid solution in an amount in the range of from about 0.1% to about 1.5% by weight of water in said solution.

10. The method of claim 1 wherein said chemical is selected from the group consisting of ethoxylated hydroabietylamines and ethoxylated alkyl amines.

11. The method of claim 1 wherein said chemical is a mixture of ethoxylated hydroabietylamines.

12. The method of claim 1 wherein said chemical is present in an amount in the range of from about 0.1% to about 3.0% by weight of water in said solution.

13. An improved method of drilling a well bore penetrating one or more crude oil producing zones using an invertible oil external-water internal emulsion drilling fluid stabilized with a nonionic amine emulsifier and then inverting the drilling fluid to a water external-oil internal emulsion, comprising the steps of:
    (a) drilling said well bore using said oil external-water internal emulsion drilling fluid;
    (b) preparing an aqueous acid solution comprised of water, hydrochloric acid, an anionic sulfonate surfactant for preventing the formation of aqueous acid solution-crude oil emulsions and crude oil sludging and a chemical for preventing said anionic sulfonate surfactant from reacting with said nonionic amine emulsifier;
    (c) contacting said oil external-water internal emulsion with said aqueous acid solution to thereby invert said emulsion; and
    (d) removing said inverted water external-oil internal emulsion from said well bore.

14. The method of claim 13 wherein said nonionic emulsifier is an ethoxylated soya amine emulsifier.

15. The method of claim 13 wherein said acid is present in said aqueous acid solution in an amount in the range of from about 1% to about 36% by weight of said water in said solution.

16. The method of claim 13 wherein said anionic sulfonate surfactant is selected from the group consisting of linear or branched dodecylbenzenesulfonic acid, linear or branched alkylbenzyl sulfonates, alkyl diphenyloxide disulfonates, alpha-olefin sulfonates and sulfosuccinates.

17. The method of claim 13 wherein said anionic sulfonate surfactant is linear dodecylbenzene sulfonic acid.

18. The method of claim 13 wherein said anionic sulfonate surfactant is present in said aqueous acid solution in an amount in the range of from about 0.1% to about 1.5% by weight of water in said solution.

19. The method of claim 13 wherein said chemical is an ethoxylated mixture of hydroabietylamines.

20. The method of claim 13 wherein said chemical is present in an amount in the range of from about 0.1% to about 3.0% by weight of water in said solution.

* * * * *